Patented Apr. 7, 1936

2,036,922

UNITED STATES PATENT OFFICE 2,036,922

ALGINIC ACID AND PROCESS OF MAKING SAME

Donald E. Clark and Harland C. Green, San Diego, Calif., assignors to Kelco Company, Los Angeles, Calif., a corporation of Delaware No Drawing. Application January 31, 1935, Serial No. 4,412

26 Claims. (Cl. 260—108)

This application is a continuation-in-part of our application for Alginic acid and process of making same, filed October 16, 1933, Serial No. 693,891.

Our invention is an improved process of producing alginic acid and alginates of high viscosity from kelp and the product of such process.

It is known that alginic acid is a substance of considerable complexity and undergoes a hydrolytic breakdown under a variety of conditions. This breakdown proceeds most rapidly when alginic acid is heated in water containing a strong acid, but it also takes place under many other conditions.

In the Thornley and Walsh process of manufacturing alginic acid and salts of alginic acid from kelp (Patent No. 1,814,981), kelp is digested for the purpose of breaking down the kelp structure and obtaining a viscous solution of alginate which is purified by dilution, heating, settling, filtration, precipitation, acidification with hydrochloric acid, removal of the insoluble alginic acid by filtration, and incorporation of this with sodium carbonate or ammonium hydroxide to produce sodium alginate or ammonium alginate.

In one step of the manufacture of alginic acid by the Thornley and Walsh process, the kelp is digested with hot sodium carbonate solution and subsequently subjected to contact with heated sodium carbonate solution for some time. During all this there is a slow, but nevertheless marked, decomposition of the alginic acid, as shown by a drop in the viscosity of a two percent solution of ammonium alginate prepared from the acid.

By our improved process the aforesaid tendency of the alginic acid to break down can be markedly decreased and the viscosity of the alginate solution can be increased several fold, and the protective action of the alginate towards other colloids enhanced. These valuable properties are more prominent in those solutions of ammonium alginate which have high viscosities, but are also obtainable in solutions of other soluble alginates, for example, sodium alginate. And, in general, the aqueous solutions of salts of alginic acid produced by our improved process possess higher viscosities and have greater efficiency in producing dispersions of insoluble solids and liquids than alginates heretofore obtained in the extraction of alginic acid from kelp.

To enable others to fully understand our improved process and products we will describe one process of producing insoluble fibrous alginic acid from "kelp" by which we mean to include any marine plants or algae containing alginic acid compounds and modifications thereof within the scope of our invention.

(1) Freshly harvested kelp is placed in a tank and leached by subjecting it to a mixture of cold fresh water and dilute hydrochloric acid at ordinary temperatures (the leaching operation may be repeated if desired) until the salts and absorbed salt solutions in the kelp derived from the sea water are sufficiently removed.

(2) The kelp is then separated from the leaching liquor and preferably chopped and placed in a tank along with a solution of sodium carbonate ($Na_2CO_3$) containing an amount of sodium carbonate such that the pH of the final, diluted sodium alginate liquor will be 9.0 to 11.0. The amount of sodium carbonate required for this purpose is between 2 and 4 per cent of the weight of leached kelp. The kelp is digested in such solution for 20 to 40 minutes, the mixture of kelp and solution being preferably heated by the admission of live steam until it is reduced to a rough pulp.

It should be understood that sodium carbonate is used above simply as illustrative, as alkalies other than sodium carbonate may be employed in the digestion step above described and the substitution of such alkalies are understood to be within the scope of the invention.

(3) The rough pulp obtained by the digesting treatment above described is then comminuted to finely divide it and facilitate the action of the sodium carbonate upon the alginic compounds in the pulp. Then the comminuted pulp is diluted with cold water until the volume is between two and four times the original volume, the diluted pulp is filtered to remove any undissolved matters, the filtrate being a clear diluted sodium alginate solution of pH 9.0 to pH 11.0.

(4) The sodium alginate solution is then treated to produce a fibrous insoluble alginate as follows:

A calcium chloride solution containing not less than fifty (50) pounds of calcium chloride per ton of raw kelp is prepared and placed in the precipitating tank provided with a suitable mixing and agitating device. To the calcium chloride solution, of pH 10 to pH 11, the aforesaid sodium alginate liquor is then added while the solution is agitated throughout the process. The agitation is continued until the reaction between the calcium chloride and the sodium alginate is completed. One product of such reaction is insoluble fibrous calcium alginate, the other is soluble sodium chloride. The solution of sodium chloride is drained away from the fibrous calcium alginate, which is then washed with water. Preferably the fibrous calcium alginate before further treatment is bleached by treatment with an appropriate bleaching agent.

(5) To convert the insoluble fibrous calcium alginate into free insoluble fibrous alginic acid, the fibrous calcium alginate, while in suspension in cold water (at a temperature of 80° F. or less), is agitated for approximately 30 minutes with sufficient hydrochloric acid to give to the liquor an acidity of pH 2.25 or less. The following reaction takes place:

$$Alg_x(Ca)_n + 2n\,HCl = Alg_x(H)2_n + nCaCl_2$$

The liquor containing the dissolved calcium chloride is drained away and the fibrous alginic acid is washed not less than twice with water at a temperature of 80° F. or less and containing sufficient hydrochloric acid to maintain a pH of less than 2.25. The alginic acid is then washed with water to give a fibrous alginic acid of pH 2.1 to pH 3.0.

Besides leaching with cold water and dilute hydrochloric acid at ordinary temperature as above, we have found that two to three short leaches made with warm water (over 100° F. but below 200° F.) enables us to get a good leach without the use of the acid, and when such leach is done immediately prior to digestion, there is little loss in efficiency of viscosity of the finished product.

We have also discovered that in place of sodium carbonate an alkali may be substituted provided it does not react to give an insoluble alginate. The amount of such substitutes which may be used depends on standard stoichiometric rules and the alkalinity of the substitute. Some of these are as follows: ammonium hydroxide, sodium hydroxide, sodium bicarbonate, etc. In addition, these products may be used singly or in conjunction with each other.

We have also found that the aforesaid process can be simplified and a product suitable for many purposes in the art but containing cellulose can be produced by omitting the filtering employed after the digesting treatment as set forth in aforesaid step (3).

The insoluble matter in the mixture at this step of our process merely consists of the insoluble cellulose or cellular debris plus a small trace of foreign matter such as sea shells. In the subsequent acid treatment step mentioned later these sea shells are dissolved by the hydrochloric acid to give soluble calcium chloride which is washed off with the calcium chloride formed by the reaction of the hydrochloric acid and calcium alginate, and carbon dioxide which passes off as a gas. The final product therefore contains only the relatively chemically inactive cellulose which does not affect the colloidal and suspending properties of the resulting product. For some purposes the presence of cellulose in sodium and ammonium alginates is not objectionable.

It is our intention to manufacture sodium alginate by our process including the filtration for the removal of insoluble matter for particular industries, and to also manufacture other grades of sodium alginate and ammonium alginate by our process without removing the cellulose for use in other industrial applications, as the outstanding differences in the properties of the products manufactured by our processes as compared to other processes is not lessened by the non-removal of the cellulose from the liquor. The non-removal of the cellulose gives a cruder, cheaper product which enables the alginate to be used in some places where the filtered product would be prohibitive in price.

In this modified process we can also omit the dilution step (see step 3 above) which is needful where filtering is done as set forth in our aforesaid application. This further omission is possible because dilution is done to facilitate separating the insoluble matter by reducing the viscosity of the liquor. Such dilution, however, is not essential when filtration is omitted. We have discovered that besides converting the insoluble fibrous calcium alginate into alginic acid by mixing with cold water and then adding hydrochloric acid as above set forth the insoluble fibrous calcium alginate may be mixed with cold dilute hydrochloric acid and obtain the same results.

Our aforesaid process differs from the Thornley and Walsh process in that we (1) use freshly harvested kelp, not over 30 hours old, and preferably as fresh as possible; (2) leach the kelp with cold, dilute hydrochloric acid instead of with warm water; (3) digest the kelp with a solution of sodium carbonate containing sodium carbonate between 2 and 4 percent of the weight of the kelp instead of 4 percent of the weight of the kelp; (4) digest the kelp for 20 to 40 minutes instead of about one hour; (5) dilute the milled pulp with cold water instead of with hot water or with water and heating the mixture; (6) filter the dilute liquor at once instead of storing it for some time and keeping it hot; (7) precipitate fibrous calcium alginate from a liquor having an alkalinity of pH 9.0 to pH 11.0 instead of a liquor of pH 8.75 to pH 9.00; (8) treat fibrous calcium alginate with cold hydrochloric acid of pH less than 2.25 instead of with hydrochloric acid of pH 2.25 to pH 3.0; and wash the fibrous alginic acid with cold hydrochloric acid of pH less than 2.25 instead of with hydrochloric acid of pH 2.25 to pH 3.0.

In our improved process of manufacture the time of heating of the kelp with sodium carbonate is reduced to a minimum; the time during which the alginic acid is in the form of sodium alginate is reduced to a minimum; the decomposition of calcium alginate by hydrochloric acid is carefully regulated in regard to time, temperature and pH control. The drying of the salts of alginic acid, for example ammonium alginate and sodium alginate, is preferably done with air at temperature below 100° F. and proper temperature controls are maintained throughout the process, and the time is shortened as much as possible, consistent with purity of the final product. In this manner the breakdown characteristic of ordinary manipulations is avoided.

The viscosity of a solution of sodium alginate manufactured by our process is very much greater than that obtained by the Thornley-Walsh process. The actual viscosity measurement by the Woolwich viscosity method gives 800 seconds for a two percent solution of ammonium alginate prepared from our product and 10 seconds for a like solution from Thornley and Walsh's product. The Woolwich viscosity method in brief consists in measuring in seconds the time required for a steel ball one sixteenth of an inch in diameter to fall 15 centimeters through the solution being tested.

Aside from the much greater viscosity of the aqueous ammonia solution, our alginate is also superior in ability to act as a protective colloid. This protective colloid feature is of value in many industrial applications, but the relatively low efficiency of the alginates prepared by the Thornley-Walsh and other processes has in the past hindered their application. This is especially true in certain food industries, for example the chocolate milk and ice cream trades where objection has been raised to the color and taste of former types of alginates. These objections are overcome by the use of our alginate due to the fact that a smaller amount is required. As an example, in the manufacture of chocolate milks it is customary to add sodium alginate to the cocoa-milk mixture to keep the cocoa fibres from settling; our new complex sodium alginate is more effective for this purpose, for 0.10 percent of our product in the final chocolate milk has proven as effective as 0.18 percent of the product made by the Thornley-Walsh process.

As another example, rubber latex containing approximately 35 percent rubber solids can be concentrated or creamed, by the addition of a suitable agent which causes the latex to separate into a cream containing most of the rubber and a heavier serum reasonably free of rubber. For this purpose it has been customary to add an amount of sodium alginate which is 0.20 percent of the total solids, whereas 0.12 percent of our new complex alginate has been found just as effective.

Another superior feature of our new alginate is its improved taste and odor. Because of and during the extensive breakdown of the alginic acid which takes place in the Thornley-Walsh process some substance or substances are produced which possess undesirable taste and odor. In our product these undesirable features are largely eliminated.

The alginic acid prepared by our process yields sodium, ammonium, and other soluble alginates of superior value as protective colloids. They prevent the precipitation or coagulation of solids and/or liquids, insoluble in water, at dilutions at which the alginates produced in the ordinary way are ineffective.

Among some of the uses to which our improved alginates may be put are the suspending of (a) insoluble solids such as silica, diatomaceous earth, infusorial earth, cocoa, fibers of fruits, edible fats including butter fat and cocoabutter fat and many other solids insoluble in water; (b) insoluble liquids such as paraffin oils, hydrocarbon oils, edible oils, including medicinal oils such as cod-liver oils, essential oils, including lemon and orange oils, and other liquids of non-acidic (or weakly acidic character) which are non-miscible with or only slightly soluble in water.

To produce an intermediate product which contains some but not all of the cellulose originally found in the kelp, the unfiltered alginic acid product just described could be blended with a filtered product such as above described. The percent of cellulose present in such a product would vary from 0 to 20% depending on the ratios used in the blend. Another method of making an intermediate product would be to blend the filtered and unfiltered liquors just prior to or during the precipitation step, or to blend the calcium alginates resulting from the precipitation step just prior or during the acid treating step. Either of these blending steps gives a product containing less cellulose, but of the same particle size. Such a product is useful in producing an oil product insoluble anti-stick film. Too much cellulose of moderate particle size would not give a sufficiently continuous coating after drying to give maximum protection. An entirely filtered product on the other hand is in most cases economically impractical, but the above described blended product overcomes both of these difficulties.

Further it is also possible to obtain another modified product containing some but not all of the cellulose in such a manner that the cellulose present contains only that of smaller particle size than found in our improved process as described in this application. Such modified product does not give a clear alginate solution when treated with an alkali as does our filtered product, but it nevertheless is much more homogenous in appearance than the product containing all or some of the cellulose of a slightly larger particle size. This modified product may be made just after the digestion step but prior to the precipitation step; by coarse filtration, centrifuging, settling, or similar well-known methods of removing larger particles from smaller particles in a solution. Our way is to dilute our digested liquor to a suitable consistency and then allow it to stand in a tank. After a while the larger cellulose particles along with most of the heavier finer foreign particles such as sea shells settle to the bottom of the tank and then the upper portion of the liquor, containing the smaller and lighter insoluble particles, is drawn off and precipitated. The lower portion may be either discarded or filtered. If it is filtered, the filtrate may be added to the upper portion of the liquor and precipitated with it. This lower portion may be also diluted and re-digested, then permitted to resettle so that if there is any algin therein not completely digested, it may be recovered. This last mentioned variation offers the possibility of manufacturing still more highly efficient alginates by still shortening digesting time and by removing the alginate as it goes into solution.

As stated above, in place of settling, centrifuges, coarse filters such as sand filters, Oliver filters, screens, etc. may be used.

We claim:—

1. The improved process of preparing fibrous alginic acid; consisting in leaching fresh kelp in a cold hydrochloric acid solution; digesting the leached kelp in a heated solution containing sodium carbonate until the kelp is reduced to a rough pulp; comminuting the rough pulp; mixing the comminuted pulp with a calcium chloride solution until the reaction between the calcium chloride and alginate is complete, removing the liquor from the fibrous calcium alginate and washing such alginate with water; agitating the fibrous alginate with a cold solution of hydrochloric acid, separating resulting alginic acid from the solution and washing it with cold hydrochloric acid; and finally separating the free fibrous alginic acid from the hydrochloric acid and washing it with cold water.

2. The improved process of preparing fibrous alginic acid; consisting in leaching fresh kelp in a hydrochloric acid solution; digesting the leached kelp in a heated solution containing sodium carbonate until the kelp is reduced to a rough pulp; mixing the comminuted pulp with a calcium chloride solution until the reaction between the calcium chloride and alginate is complete, removing the liquor from the fibrous calcium alginate and washing the alginate with water; agitating the fibrous alginate with a cold solution of hydrochloric acid having a pH of about 2.25, separating resulting alginic acid from the solution and washing it with hydrochloric acid of about 2.25; and finally separating the free fibrous alginic acid from the hydrochloric acid and washing it with cold water.

3. The improved process of preparing fibrous alginic acid; consisting in leaching fresh kelp in a cold hydrochloric acid solution at room temperature; separating and chopping the leached kelp and digesting it in a heated solution containing sodium carbonate until the kelp is reduced to a rough pulp; comminuting the rough pulp; mixing the comminuted pulp with a calcium chloride solution; agitating the mixture until the reaction between the calcium chloride and alginate is complete; removing the liquor from the fibrous calcium alginate and washing the alginate with cold water; agitating the fibrous alginate with a solution of hydrochloric acid, separating the resulting fibrous alginic acid from the solution and washing it with hydrochloric acid of pH about 2.25; and finally separating the free fibrous alginic acid from the hydrochloric acid and washing it with cold water.

4. The improved process of preparing fibrous alginic acid; consisting in leaching fresh kelp in a hydrochloric acid solution; digesting the leached kelp in a heated solution containing sodium carbonate until the kelp is reduced to a rough pulp; comminuting the rough pulp; mixing such comminuted pulp mixture with a calcium chloride solution having a pH of about 10 to 11 until the reaction between the calcium chloride and alginate is complete, removing the liquor from the fibrous calcium alginate and washing the alginate with water; agitating the fibrous alginate with a cold solution of hydrochloric acid so that the pH of the solution is not over 2.25, separating resulting alginic acid from the solution and washing it with hydrochloric acid of pH not over 2.25; and finally separating the free fibrous alginic acid from the hydrochloric acid and washing it with cold water.

5. The improved process of preparing fibrous alginic acid; consisting in leaching fresh kelp in a hydrochloric acid solution; digesting the leached kelp in a heated solution containing sodium carbonate until the kelp is reduced to rough pulp; comminuting the rough pulp; diluting the comminuted pulp with cold water to give a pH of about 9.0 to 11.0; mixing such comminuted pulp mixture with a calcium chloride solution having a pH of about 10 to 11 until the reaction between the calcium chloride and alginate is complete, removing the liquor from the fibrous calcium alginate and washing the alginate with water; agitating the fibrous alginate with a cold solution of hydrochloric acid so that the pH of the solution is not over 2.25, separating resulting fibrous alginic acid from the solution and washing it with hydrochloric acid of pH not over 2.25; and finally separating the free fibrous alginic acid from the hydrochloric acid and washing it with cold water.

6. A fibrous alginic acid product produced by blending a product prepared by the process set forth in claim 1 with a product produced by a similar process omitting the step of mixing the pulp with calcium chloride solution set forth in claim 1, and substituting therefor the additional steps of diluting the comminuted pulp, filtering it and mixing the filtrate with calcium chloride.

7. The improved process of preparing fibrous alginic acid consisting in leaching fresh kelp in a cold hydrochloric acid solution, digesting the leached kelp in a heated solution containing sodium carbonate until the kelp is reduced to a rough pulp, comminuting the rough pulp, mixing a portion of such comminuted pulp with a calcium chloride solution until the reaction is complete; filtering another portion of such comminuted pulp and mixing the filtrate with a calcium chloride solution until the reaction is complete, blending the resultant unfiltered and filtered liquors, removing the liquor from the fibrous calcium alginate, washing such alginate; agitating it with a cold acid which will react with calcium alginate to form alginic acid and a water soluble calcium salt, separating resulting fibrous alginic acid from the solution and washing it with the last mentioned cold acid; and finally separating the free fibrous alginic acid and washing it.

8. Fibrous alginic acid produced by the process set forth in claim 7.

9. The improved process of preparing fibrous alginic acid consisting in leaching fresh kelp in a cold solution of hydrochloric acid solution, digesting the leached kelp in a heated solution containing sodium carbonate until the kelp is reduced to a rough pulp, comminuting the rough pulp, mixing a portion of such comminuted pulp with a calcium chloride solution until the reaction is complete, filtering another portion of such comminuted pulp and mixing the filtrate with a calcium chloride solution until the reaction is complete, removing the liquor from said fibrous calcium alginate mixture and washing such alginate with water; mixing the resultant fibrous alginates and agitating the mixture with cold hydrochloric acid, separating the resulting fibrous alginic acid from the solution and washing it with a cold hydrochloric acid solution; and finally separating the free fibrous alginic acid and washing it with cold water.

10. The improved process of preparing fibrous alginic acid; consisting in leaching fresh kelp in a cold hydrochloric acid solution; digesting the leached kelp in a heated solution containing sodium carbonate until the kelp is reduced to a rough pulp; comminuting the rough pulp; mixing the comminuted pulp with a calcium chloride solution until the reaction between the calcium chloride and alginate is complete, removing the larger particles of cellulose after the digestion step and prior to precipitation, removing the liquor from the fibrous calcium alginate and washing such alginate with water; agitating the fibrous alginate with a cold solution of hydrochloric acid; separating the resulting fibrous alginic acid from the solution and washing it with cold hydrochloric acid; and finally separating the free fibrous alginic acid from the hydrochloric acid and washing it with cold water.

11. The improved process of preparing fibrous alginic acid; consisting in leaching fresh kelp; digesting the leached kelp in a heated solution containing an alkali which will not react to give an insoluble alginate, until the kelp is reduced to a pulp; comminuting the pulp; mixing the comminuted pulp with a calcium chloride solution until the reaction between the calcium chloride and alginate is complete; removing the liquor from the fibrous calcium alginate and washing such alginate with water; agitating the fibrous alginate with a cold hydrochloric acid solution; separating the resulting fibrous alginic acid from the solution and again washing it with a cold hydrochloric acid solution; and finally separating the free fibrous alginic acid and washing it with cold water.

12. Fibrous alginic acid produced by the process set forth in claim 11.

13. The improved process of preparing fibrous alginic acid; consisting in leaching fresh kelp; digesting the leached kelp in a heated solution containing an alkali which will not react to give an insoluble alginate, until the kelp is reduced to a pulp; mixing the comminuted pulp with a calcium chloride solution until the reaction between the calcium chloride and alginate is complete, removing the liquor from the fibrous calcium alginate and washing the alginate with water; agitating the fibrous alginate with a cold acid solution having a pH of about 2.25, separating the resulting fibrous alginic acid from the solution and again washing it with an acid solution having a pH of about 2.25; and finally separating the free fibrous alginic acid and washing it with cold water.

14. The improved process of preparing fibrous alginic acid; consisting in leaching fresh kelp in a cold hydrochloric acid solution; digesting the leached kelp in a heated solution containing sodium carbonate until the kelp is reduced to a rough pulp; comminuting the rough pulp; mixing the comminuted pulp with a calcium chloride solution until the reaction between the calcium chloride and alginate is complete; removing the liquor from the fibrous calcium alginate and washing such alginate with water; mixing the fibrous alginate with a cold dilute solution of hydrochloric acid; and finally separating the free fibrous alginic acid from the hydrochloric acid and washing it with cold water.

15. The improved process of preparing fibrous alginic acid; consisting in leaching fresh kelp in a hydrochloric acid solution; digesting the leached kelp in a heated solution containing sodium carbonate until the kelp is reduced to a rough pulp; comminuting the rough pulp; diluting the comminuted pulp with cold water to give a pH of about 9.0 to 11.0, and filtering the mixture; mixing the filtrate with a calcium chloride solution having a pH of about 10 to 11 until the reaction between the calcium chloride and alginate is complete, removing the liquor from the fibrous calcium alginate and washing the alginate with water; agitating the fibrous alginate with a cold solution of hydrochloric acid so that the pH of the solution is not over 2.25, separating the alginic acid from the solution and washing it with hydrochloric acid of pH not over 2.25; and finally separating the free fibrous alginic acid from the hydrochloric acid and washing it with cold water.

16. Fibrous alginic acid produced by the process set forth in claim 15.

17. The improved process of preparing fibrous alginic acid; consisting in leaching fresh kelp in a cold hydrochloric acid solution at room temperature; separating and chopping the leached kelp and digesting it in a heated solution containing an amount of sodium carbonate about 2 to 4 percent of the weight of the leached kelp until the kelp is reduced to a rough pulp; comminuting the rough pulp; diluting the comminuted pulp with cold water to give a pH of about 9.0 to 11.0, and filtering the mixture; mixing the filtrate with a calcium chloride solution containing about 50 pounds of calcium chloride per ton of raw kelp and having a pH of about 10 to 11; agitating the mixture until the reaction between the calcium chloride and alginate is complete, removing the liquor from the fibrous calcium alginate and washing the alginate with water; agitating the fibrous alginate with a solution of hydrochloric acid so that the pH of the solution is not over 2.25, separating the alginic acid from the solution and washing it with hydrochloric acid of pH less than 2.25; and finally separating the free fibrous alginic acid from the hydrochloric acid and washing it with cold water.

18. The improved process of preparing fibrous alginic acid; consisting in leaching fresh kelp in a mixture of cold water and hydrochloric acid; separating and chopping the leached kelp and digesting it in a heated solution containing an amount of sodium carbonate which is 2 to 4 percent of the weight of the leached kelp until the kelp is reduced to a rough pulp; comminuting the rough pulp to facilitate the action of the alkali upon the alginate compounds; diluting the comminuted pulp with 1 to 3 volumes of cold water to give a pH of 9.0 to 11.0, and filtering the mixture; mixing the filtrate with a calcium chloride solution containing not less than 50 pounds of calcium chloride per ton of raw kelp and having a pH of about 10 to 11; agitating the mixture until the reaction between the calcium chloride and alginate is complete, removing the liquor from the fibrous calcium alginate and washing the alginate with water; agitating the fibrous alginate with a cold solution of hydrochloric acid so that the pH of the solution is less than 2.25, separating the formed alginic acid from the solution and washing it at least twice with hydrochloric acid of pH less than 2.25; and finally separating the free fibrous alginic acid from the hydrochloric acid and washing it with cold water.

19. The improved process of preparing fibrous alginic acid; consisting in leaching fresh kelp in a mixture of cold fresh water and hydrochloric acid at room temperature; separating and chopping the leached kelp and digesting it in a heated solution containing an amount of sodium carbonate which is 2 to 4 percent of the weight of the leached kelp until the kelp is reduced to a rough pulp; comminuting the rough pulp to facilitate the action of the alkali upon the alginate compounds; diluting the comminuted pulp with 1 to 3 volumes of cold water to give a pH of 9.0 to 11.0, and filtering the mixture; mixing the filtrate with a calcium chloride solution containing not less than 50 pounds of calcium chloride per ton of raw kelp and having a pH of about 10 to 11; agitating the mixture until the reaction between the calcium chloride and alginate is complete, removing the liquor from the fibrous calcium alginate and washing the alginate with water; agitating the fibrous alginate with a cold solution of hydrochloric acid so that the pH of the solution is less than 2.25, separating the formed alginic acid from the solution and washing it at least twice with hydrochloric acid of pH less than 2.25; and finally separating the free fibrous alginic acid from the hydrochloric acid and washing it with cold water.

20. The improved process of preparing fibrous alginic acid; consisting in subjecting freshly harvested kelp to a mixture of cold fresh water and hydrochloric acid to remove salts and absorbed salt solutions derived from the sea water; separating the leached kelp, chopping it and digesting the chopped kelp in a heated solution containing an amount of sodium carbonate which is 2 to 4 percent of the weight of the leached kelp until the kelp is reduced to a rough pulp; comminuting the rough pulp in a hammer mill, diluting the comminuted pulp with 1 to 3 volumes of cold water to give a pH of 9.0 to 11.0 and removing insoluble matter from the liquor; mixing the liquor with a calcium chloride solution containing not less than 50 pounds of calcium chloride per ton of raw kelp and having a pH of about 10 to 11; agitating the mixture until the reaction between the calcium chloride and alginate is complete, removing the liquor from the fibrous calcium alginate and washing the alginate with water; agitating the fibrous alginate with a cold solution of hydrochloric acid so that the pH of the solution is less than 2.25, separating the formed alginic acid from the solution and washing it at least twice with hydrochloric acid of pH less than 2.25; and finally separating the free fibrous alginic acid from the hydrochloric acid and washing it with cold water.

21. Fibrous alginic acid produced by the process set forth in claim 20.

22. The improved process of preparing fibrous alginic acid; consisting in leaching fresh kelp in a cold hydrochloric acid solution; digesting the leached kelp in a heated solution containing sodium carbonate until the kelp is reduced to a rough pulp; comminuting the rough pulp; diluting the comminuted pulp with cold water, and removing insoluble matter from the liquor; mixing the liquor with a calcium chloride solution until the reaction between the calcium chloride and alginate is complete, removing the liquor from the fibrous calcium alginate and washing such alginate with water; agitating the fibrous alginate with a cold solution of hydrochloric acid, separating the resulting fibrous alginic acid from the solution and washing it with cold hydrochloric acid; and finally separating the free fibrous alginic acid from the hydrochloric acid and washing it with cold water.

23. Fibrous alginic acid produced by the process set forth in claim 22.

24. The improved process of preparing fibrous alginic acid; consisting in leaching fresh kelp in a cold hydrochloric acid solution at room temperature; separating and chopping the leached kelp and digesting it in a heated solution containing sodium carbonate until the kelp is reduced to a rough pulp; comminuting the rough pulp; diluting the comminuted pulp with cold water to give a pH of about 9.0 to 11.0 and removing insoluble matter from the mixture; mixing the liquor with a calcium chloride solution having a pH of about 9 to 11; agitating the mixture until the reaction between the calcium chloride and alginate is complete; removing the liquor from the fibrous calcium alginate and washing the alginate with cold water; agitating the fibrous alginate with a solution of hydrochloric acid, separating the resulting fibrous alginic acid from the solution and washing it with hydrochloric acid of pH about 2.25; and finally separating the free fibrous alginic acid from the hydrochloric acid and washing it with cold water.

25. The process of preparing fibrous alginic acid; consisting in leaching fresh kelp in a cold hydrochloric acid solution, digesting the leached kelp in a heated solution containing sodium carbonate until the kelp is reduced to a rough pulp, comminuting the rough pulp, filtering a portion of such comminuted pulp and blending the filtered and unfiltered portions together and then mixing the blended portions with calcium chloride solution until the reaction is complete, removing the liquor from the fibrous calcium alginate, washing such alginate, agitating it with an acid which will react with calcium alginate to form alginic acid and a water soluble calcium salt, separating resulting fibrous alginic acid from the solution and washing it with the last mentioned cold acid; and finally separating the free fibrous alginic acid and washing it.

26. The process of preparing fibrous alginic acid; consisting in leaching fresh kelp in a cold hydrochloric acid solution, digesting the leached kelp in a heated solution containing sodium carbonate until the kelp is reduced to a rough pulp, comminuting the rough pulp, filtering a portion of such comminuted pulp and mixing the unfiltered portion of the pulp and the filtered portion simultaneously with calcium chloride until the reaction is complete, removing the liquor from the fibrous calcium alginate, washing such alginate; agitating it with an acid which will react with calcium alginate to form alginic acid and a water soluble calcium salt, separating resulting fibrous alginic acid from the solution and washing it with the last mentioned cold acid; and finally separating the free fibrous alginic acid and washing it.

HARLAND C. GREEN.
DONALD E. CLARK.